US012207121B2

United States Patent
He et al.

(10) Patent No.: US 12,207,121 B2
(45) Date of Patent: Jan. 21, 2025

(54) ACTIVATION OF MEASUREMENT GAP CONFIGURATION

(71) Applicant: Nokia Technologies Oy, Espoo (FI)

(72) Inventors: Jing He, Beijing (CN); Lei Du, Beijing (CN); Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 400 days.

(21) Appl. No.: 17/738,721

(22) Filed: May 6, 2022

(65) Prior Publication Data
US 2022/0408291 A1 Dec. 22, 2022

(30) Foreign Application Priority Data

May 19, 2021 (WO) ................ PCT/CN2021/094667

(51) Int. Cl.
*H04W 24/10* (2009.01)
(52) U.S. Cl.
CPC .................... *H04W 24/10* (2013.01)
(58) Field of Classification Search
CPC .. H04W 24/10; H04W 36/06; H04W 36/0088
See application file for complete search history.

(56) References Cited

U.S. PATENT DOCUMENTS

| | | | | |
|---|---|---|---|---|
| 2023/0337023 A1* | 10/2023 | Li | ........................ | H04W 24/10 |
| 2023/0362696 A1* | 11/2023 | Li | ........................ | H04W 24/10 |
| 2024/0163696 A1* | 5/2024 | Hong | .................... | H04W 24/02 |

FOREIGN PATENT DOCUMENTS

CN 112771924 A 5/2021

OTHER PUBLICATIONS

Extended European Search Report received for corresponding European Patent Application No. 21940134.6, dated Jun. 20, 2023, 10 pages.
"Analysis of requirements for pre-configured measurement gap pattern", 3GPP TSG RAN WG4 Meeting #99-e, R4-2111311, Agenda: 9.10.2.1, Ericsson, May 19-27, 2021, 10 pages.
"Analysis of requirements for pre-configured measurement gap pattern", 3GPP TSG RAN WG4 Meeting #98bis-e, R4-2107151, Agenda: 8.5.2.1, Ericsson, Apr. 12-20, 2021, 10 pages.

(Continued)

*Primary Examiner* — John D Blanton
(74) *Attorney, Agent, or Firm* — McCarter & English LLC

(57) ABSTRACT

Embodiments of the present disclosure relate to a method, device and computer readable storage medium of communication. The method implemented at a first device comprises receiving, from a second device, a message for bandwidth part switching for the first device, the message triggering the first device to activate a measurement gap configuration, the measurement gap configuration indicating one or more measurement gaps. The method further comprises delaying to apply at least one measurement gap of the one or more measurement gaps. In this way, the delay of the bandwidth part switching procedure is controllable and predictable for both the first and the second device, and further the required necessary interaction after the bandwidth part switching is ensured thereby, while the new measurement gap configuration may be activated as soon as possible.

20 Claims, 8 Drawing Sheets

(56) References Cited

OTHER PUBLICATIONS

"Overview of requirements for pre-configured measurement gaps", 3GPP TSG RAN WG4 Meeting #98-e, R4-2102655, Agenda: 11.5.2.1, Ericsson, Jan. 25-Feb. 5, 2021, 8 pages.

"New WI Proposal: NR measurement gap enhancements", 3GPP TSG RAN Meeting #89e, RP-202119, Agenda: 9.1.2, Intel Corporation, Sep. 14-18, 2020, 5 pages.

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"3rd Generation Partnership Project; Technical Specification Group Radio Access Network; NR; Requirements for support of radio resource management (Release 17)", 3GPP TS 38.133, V17.1.0, Mar. 2021, 2172 pages.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Radio Access Network; NR; Multiplexing and channel coding (Release 16)", 3GPP TS 38.212, V16.5.0, Mar. 2021, pp. 1-152.

"IEEE 802.11", Wikipedia, Retrieved on Apr. 20, 2022, Webpage available at : https://en.wikipedia.org/wiki/ IEEE_802.11.

International Search Report and Written Opinion received for corresponding Patent Cooperation Treaty Application No. PCT/CN2021/094667, dated Feb. 15, 2022, 9 pages.

"Discussion on pre-configured measurement gap", 3GPP TSG-RAN WG4 Meeting # 98-bis-e, R4-2109228, Agenda: 8.5.2.1, Intel Corporation, Apr. 12-20, 2021, 15 pages.

"Pre-configured MG pattern(s) per configured BWP", 3GPP TSG-RAN WG4 Meeting #98-bis-e, R4-2104582, Agenda: 8.5.2.1, MediaTek Inc, Apr. 12-20, 2021, 6 pages.

"Views on pre-configured MG patterns", 3GPP TSG-RAN WG4 Meeting #98-e, R4-2102622, Agenda: 11.5.2.1, Qualcomm CDMA Technologies, Jan. 25-Feb. 5, 2021, pp. 1-3.

\* cited by examiner

ACTIVATION OF MEASUREMENT GAP CONFIGURATION

RELATED APPLICATIONS

This application claims priority from PCT Application No. PCT/CN2021/094667, filed on May 19, 2021, which is hereby incorporated in its entirety.

FIELD

Embodiments of the present disclosure generally relate to the field of telecommunication and in particular, to devices, methods and computer readable storage media for activation of measurement gap (MG) configuration.

BACKGROUND

Wireless communications systems are widely deployed to provide various types of communication content such as voice, video, packet data, messaging, broadcast, and so on. A typical wireless communication system at least comprises a plurality of network devices and a plurality of terminal devices, where the plurality of network devices provide services to the terminal devices within their coverages.

In some cases, the terminal device may be configured with a MG pattern indicating a one or more MGs. During the MGs, the terminal device will suspend/disable its communication with its serving network device, while perform required measurement on a target carrier/frequency the same as or different from that of the serving network device. Further, in some scenario, for example, when the terminal device is configured to switch to a new bandwidth part (BWP), the terminal needs to activate a new MG pattern. It is expected to ensure the scheduling of important signalling and/or data after the BWP switch and further expected the new MG pattern may be activated.

SUMMARY

In general, example embodiments of the present disclosure provide a solution for activation of MG configuration.

In a first aspect, there is provided a first device. The first device comprises at least one processor; and at least one memory including computer program code; where the at least one memory and the computer program code are configured to, with the at least one processor, cause the first device to receive, from a second device, a message for switching the first device to a bandwidth part, the message triggering the first device to activate a measurement gap configuration, the measurement gap configuration indicating one or more measurement gaps; and delay to apply at least one measurement gap of the one or more measurement gaps.

In a second aspect, there is provided a second device. The second device comprises at least one processor; and at least one memory including computer program code; where the at least one memory and the computer program code are configured to, with the at least one processor, cause the second device to transmit, to a first device, a message for switching the first device to a bandwidth part, the message triggering the first device to activate a measurement gap configuration, the measurement gap configuration indicating one or more measurement gaps; and enable a transmission with the first device during at least one measurement gap of the one or more measurement gaps.

In a third aspect, there is provided a method. The method comprises receiving, at a first device and from a second device, a message for switching the first device to a bandwidth part, the message triggering the first device to activate a measurement gap configuration, the measurement gap configuration indicating one or more measurement gaps. The method further comprises delaying to apply at least one measurement gap of the one or more measurement gaps.

In a fourth aspect, there is provided a method. The method comprises transmitting, at a second device to a first device, a message for switching the first device to a bandwidth part, the message triggering the first device to activate a measurement gap configuration, the measurement gap configuration indicating one or more measurement gaps. The method further comprises enabling a transmission with the first device during at least one measurement gap of the one or more measurement gaps.

In a fifth aspect, there is provided a first apparatus. The first apparatus comprises means for receiving, at a first apparatus and from a second apparatus, a message for switching the first apparatus to a bandwidth part, the message triggering the first apparatus to activate a measurement gap configuration, the measurement gap configuration indicating one or more measurement gaps. The first apparatus further comprises means for delaying to apply at least one measurement gap of the one or more measurement gaps.

In a sixth aspect, there is provided a second apparatus. The second apparatus comprises means for transmitting, at a second apparatus to a first apparatus, a message for switching the first apparatus to a bandwidth part, the message triggering the first apparatus to activate a measurement gap configuration, the measurement gap configuration indicating one or more measurement gaps. The second apparatus further comprises means for enabling a transmission with the first apparatus during at least one measurement gap of the one or more measurement gaps.

In a seventh aspect, there is provided a computer readable medium. The computer readable medium comprises program instructions for causing an apparatus to perform at least the method according to the third aspect.

In an eighth aspect, there is provided a computer readable medium. The computer readable medium comprises program instructions for causing an apparatus to perform at least the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1A:
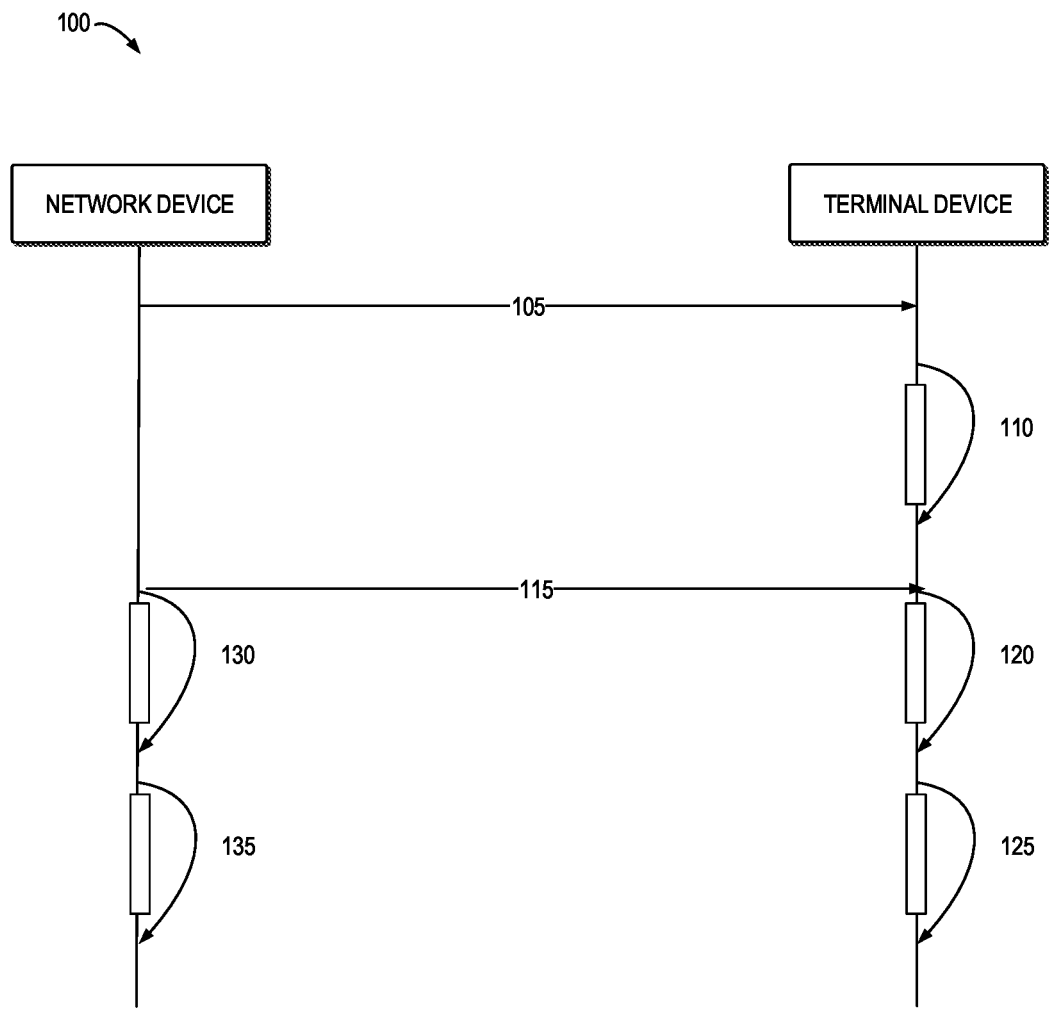
FIGS. 1A and 1B illustrate conventional signaling flows for activation of MG configuration.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
 (a) hardware-only circuit implementations (such as implementations in only analog and/or digital circuitry) and
 (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

As used herein, the term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

Since release 15 (Rel-15) of 3GPP, the terminal device has been supported to be configured with up to four BWPs via one radio resource control (RRC) Reconfiguration message, where only one of the BWPs is active and the others are pre-configured/candidate BWPs which can be quickly switched to be an active BWP by a DCI message (also referred to as "PDCCH order"). For example, for paired spectrum (such as, frequency division duplexing, FDD), the terminal device can be configured with initial DL/UL BWP and up to four downlink (DL) and up to four uplink (UL) BWPs in a serving cell. Further, for unpaired spectrum (such as, time division duplexing, TDD), the terminal device can be configured with initial DL/UL BWP and up to four UL-DL BWP-pairs in a serving cell, where center frequency for UL and DL is the same and the BWPs with same BWP identifiers form a BWP-pair. In addition, it is required that only one DL and UL BWP or one BWP-pair is active for the terminal device at any given time in a serving cell.

As discussed above, in the wireless communication system, the terminal device may be configured with a MG pattern indicating a one or more MGs. During the MGs, the terminal device will suspend/disable its communication with its serving network device, while perform measurement on a carrier/frequency the same as or different from that of the serving network device. Further, in some scenario, for example, when the terminal device is configured to switch to a new BWP, the terminal needs to activate a new MG pattern.

Wireless Standardization Organizations (such as, the third Generation Partnership Project, 3GPP) have made some work about the MG configuration (for example, MG pattern) as will be discussed below.

In Rel-15, it is required that the MG pattern is always configured by network to UE via RRC reconfiguration message if gaps are required for measuring the configured measurement objectives, and the MG pattern always includes some parameters, e.g. gapOffset, mgl, mgrp and mgta, where "gapOffset" refers to the gap offset of a measurement gap pattern, "mgl" refers to measurement gap length, "mgrp" refers to measurement gap repetition period and "mgta" refers to measurement gap timing advance. One example of MG configuration comprising the above parameter is illustrated as below.

GapConfig::=SEQUENCE {
    gapOffset INTEGER (0 . . . 159),
    mgl ENUMERATED {ms1dot5, ms3, ms3dot5, ms4, ms5dot5, ms6},
    mgrp ENUMERATED {ms20, ms40, ms80, ms160},
    mgta ENUMERATED {ms0, ms0dot25, ms0dot5}, The conventional MG configuration mechanism defined in Rel-15 of 3GPP is discussed with reference to FIG. 1A. FIG. 1A illustrates a signaling flow 100 for MG configuration mechanism.

As shown in FIG. 1A, the network device transmits 105 a DCI message to the terminal device, where the DCI message indicates the terminal device to switch to an inactive/candidate BWP. The terminal device processes 110 the DCI message. Then, the network device transmits 115 a RRC reconfiguration message to the terminal device, wherein the RRC reconfiguration message configures a MG pattern for the terminal device. Upon receiving the RRC reconfiguration message, the terminal device may activate the MG pattern immediately. As illustrated in FIG. 1A, the terminal device performs 120 and 125 measurements during the MGs according to the MG pattern, where the terminal device is required neither to receive nor transmit transmission with the serving cell during the MGs. Accordingly, the network device disables 130 and 135 the transmission with the terminal device (such as, the network device cannot schedule any data transmission with the terminal device) in the serving cell during the MGs.

In FIG. 1A, the network device configures the MG pattern through the RRC reconfiguration procedure after transmitting the DCI message. Therefore, the network device has flexibility to control the time point for activating the MG configuration (i.e., the MG pattern). However, since the activation of the MG configuration requires a dedicated RRC reconfiguration procedure, which results that the MG configuration cannot be activated in time after the terminal device has switched to the new BWP, which is an undesirable result.

In order to activate the MG configuration as early as possible, enhancements for MG configuration have been discussed in release 17 (Rel-17) of 3GPP. Some aspects of enhancements for MG configuration have been approved by a work item of 3GPP, such as, pre-configured MG per active BWP (also referred to as fast MG configuration), multiple concurrent and independent MG patterns and network controlled small gaps (NCSG).

As for the aspect of pre-configured MG per active BWP, many technical details need to be discussed. The technical details needed to be discussed comprises:

Radio resource management (RRM) requirements for pre-configured MG pattern(s), comprising: studying requirements of the mechanisms of activation/deactivation of MG following a DCI or timer based BWP switch, specifying of rules and UE behavior for activation/deactivation of a MG following a DCI or timer based BWP switch, and defining measurement period requirements with pre-configured MG pattern(s) in the presence of one or more BWP switch per measurement period;

Specification of applicability of pre-configured MG pattern(s); and

Procedures and signaling for pre-configured MG pattern(s), for example, specifying protocol impacts about the mechanisms of activation/deactivation of MG following a DCI or timer based BWP switch.

In addition, the new WI of 3GPP also listed some procedures for pre-configured MG to be further studied, the procedures comprising:

Re-configuration of the pre-configured MG (such as, whether a specific procedure for activation after the RRC configuration is needed);

Activation and deactivation of the pre-configured MG following a DCI or timer-based BWP switch (such as, the conditions and details of these procedures). The MG activation in this context means that both NW and UE assume that the pre-configured MG will be used for measurements. The MG deactivation in this context means that both the network and UE assume that the pre-configured MG will not be used for measurements and UE should be able to receive scheduled data;

Configuration of the pre-configured MGs (such as, whether the pre-configured MGs are configured per BWP, per UE or per FR which are same as these of legacy MGs); and Relation of pre-configured MG pattern and with the current RRC configured MG. One option of the relation is that the pre-configured MG in one active BWP can over-ride current RRC configured MG until active BWP switch to a new BWP without per-configured MG pattern. Another option of the relation is that the pre-configured MG is the RRC configured MG in Rel-15, and it may be ON/OFF after BWP switch.

Figure 1B:
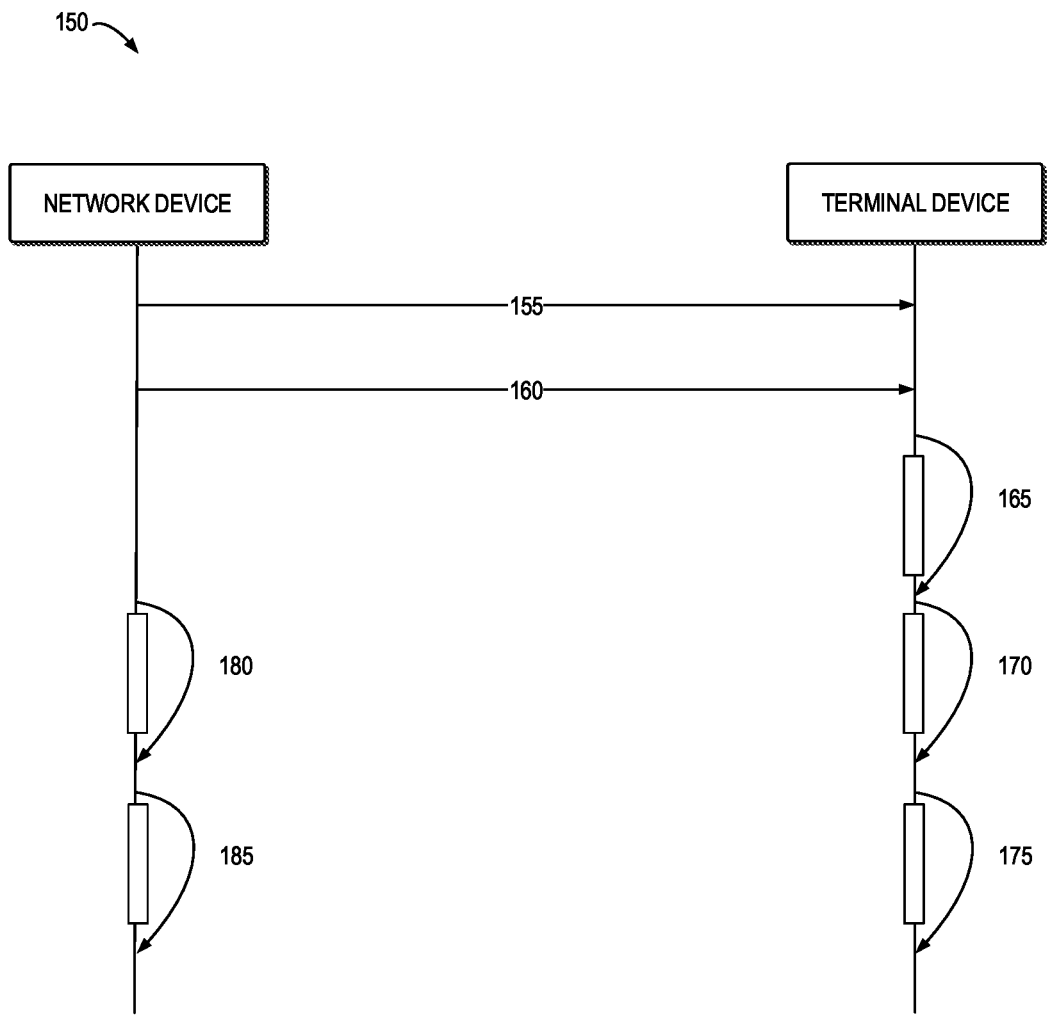

The conventional MG configuration mechanism defined in Rel-17 of 3GPP is discussed with reference to FIG. 1B. FIG. 1B illustrates a signaling flow 150 for MG configuration mechanism.

As shown in FIG. 1B, the network device transmits 155 a RRC reconfiguration message to the terminal device, wherein the RRC re-configuration message is used to pre-configure the MG pattern for the terminal device. For instance, the network device may configure one or several MG patterns for each of the configured BWPs. The network device may transmit the RRC re-configuration message at any suitable time points. Then, the network device transmits 160 a DCI message to the terminal device, where in the DCI message indicates the terminal device to switch to an inactive/candidate BWP. The terminal device processes 165 the DCI message and the pre-configured MG pattern may be activated accordingly. As illustrated in FIG. 1B, the terminal device performs 170 and 175 measurements during the MGs according to the MG pattern, where the terminal device is required neither to receive nor transmit transmission with the serving cell during the MGs. Accordingly, the network device disables 180 and 185 the transmission with the terminal device (such as, the network device cannot schedule any data transmission with the terminal device) during the GPs. In a wireless communication system with centralized unit (CU)/distributed unit (DU) architecture, the DCI message may be transmitted by a DU based on current channel quality and required quality of service (QoS). Further, the data scheduling is controlled by DU (for example, no data is scheduled in the serving cell during MGs). As for CU, after configuring the MG pattern, the time point to activate the MG pattern is totally uncontrollable.

Compared with the conventional MG configuration mechanism defined in Rel-15 (i.e. MG configuration and activation has to be done by one extra RRC reconfiguration procedure after the BWP switching procedure), the mechanism of pre-configured MG defined in Rel-17 (also referred to as DCI-based BWP switch) enables a quick activation of MG configuration during BWP switching, because the command to switch BWP can be used to activate pre-configured MG pattern at the same time.

However, there are some specific requirements for BWP switching procedure. Specifically, it is required that after BWP switching, the terminal device should transmit something (such as, data, message, signalling and so on) to network device and the network device also should transmit something to the terminal device via the new active BWP. For example, it is required that for each activated serving cell configured with a BWP, if a BWP is activated and the active DL BWP for the serving cell is not the dormant BWP, the medium access control (MAC) entity shall:

Transmit on uplink shared control channel (UL-SCH) on the BWP;

Transmit on random access channel (RACH) on the BWP, if Physical random access channel (PRACH) occasions are configured;

Monitor the physical downlink control channel (PDCCH) on the BWP;

Transmit physical uplink control channel (PUCCH) on the BWP, if configured;

Report channel state information (CSI) for the BWP;

Transmit SRS on the BWP, if configured;

Receive downlink shared control channel (DL-SCH) on the BWP;

(Re-)initialize any suspended configured uplink grants of configured grant Type 1 on the active BWP according to the stored configuration, if any.

Additionally, the terminal device is required to be able to transmit and receive transmission immediately after the BWP has been switched. Specifically, for the DCI-based BWP switch, after the UE receives a BWP switching request (i.e., DCI message) from the serving cell at slot n, the terminal device shall be able to receive PDSCH (for DL active BWP switch) or transmit PUSCH (for UL active BWP switch) on the new BWP after a time duration (also referred to as $T_{BWPswitchDelay}$). That is, it is requires that the terminal device should be able to transmit and receive transmission at slot $n+T_{BWPswitchDelay}$.

The parameter $T_{BWPswitchDelay}$ may be stipulated in wireless standards (such as, 3GPP standards). As one example, below Table 1 stipulated in 3GPP standards defines the BWP switch delay, i.e., the parameter $T_{BWPswitchDelay}$.

TABLE 1

| | | BWP switch delay | |
|---|---|---|---|
| | NR Slot length | BWP switch delay $T_{BWPswitchDelay}$ (slots) | |
| μ | (ms) | Type 1 | Type 2 |
| 0 | 1 | 1 | 3 |
| 1 | 0.5 | 2 | 5 |
| 2 | 0.25 | 3 | 9 |
| 3 | 0.125 | 6 | 18 |

The types (i.e., Type 1 or Type 2) are depended on the capability of the terminal device. If the BWP switch involves changing of SCS, the BWP switch delay is determined by the smaller SCS between the SCS before BWP switch and the SCS after BWP switch.

Refer back to FIG. 1B. As discussed above, the MGs are pre-configured by the RRC reconfiguration message, while the MG configuration is activated by the subsequent DCI message. Therefore, the relationship between the first MG and the time window for processing the DCI message is dynamic. In this event, if the first activated MG starts too early, the terminal device and the network device will not have time to do transmission immediately after BWP switching. If so, the interaction procedure after the BWP switching stipulated by the standards cannot be performed, and the network device cannot determine whether the BWP switching is successfully. Therefore, although the conventional MG pattern configuration mechanism being discussed in Rel-17 enables a fast activation of the MG configuration, this solution is not suitable for some specific scenarios.

According to some example embodiments of the present disclosure, there is proposed a solution for activation of MG configuration.

In this solution, a first device (such as, a terminal device) receives a message for switching the first device to a BWP from a second device (such as, a network device). The message triggers the second device to activate a MG configuration, where the MG configuration indicates one or more MGs. Then, the first device may delay to apply at least one MG thereby. Similarly, after transmitting the message, the second device may enable a transmission with the first device during at least one MG of the one or more of MGs. In this way, the delay of the BWP switching procedure is controllable and predictable for both the first and the second device, and further the required necessary interaction after the BWP switching is ensured thereby, while the new MG configuration may be activated at the earliest time.

Figure 2:
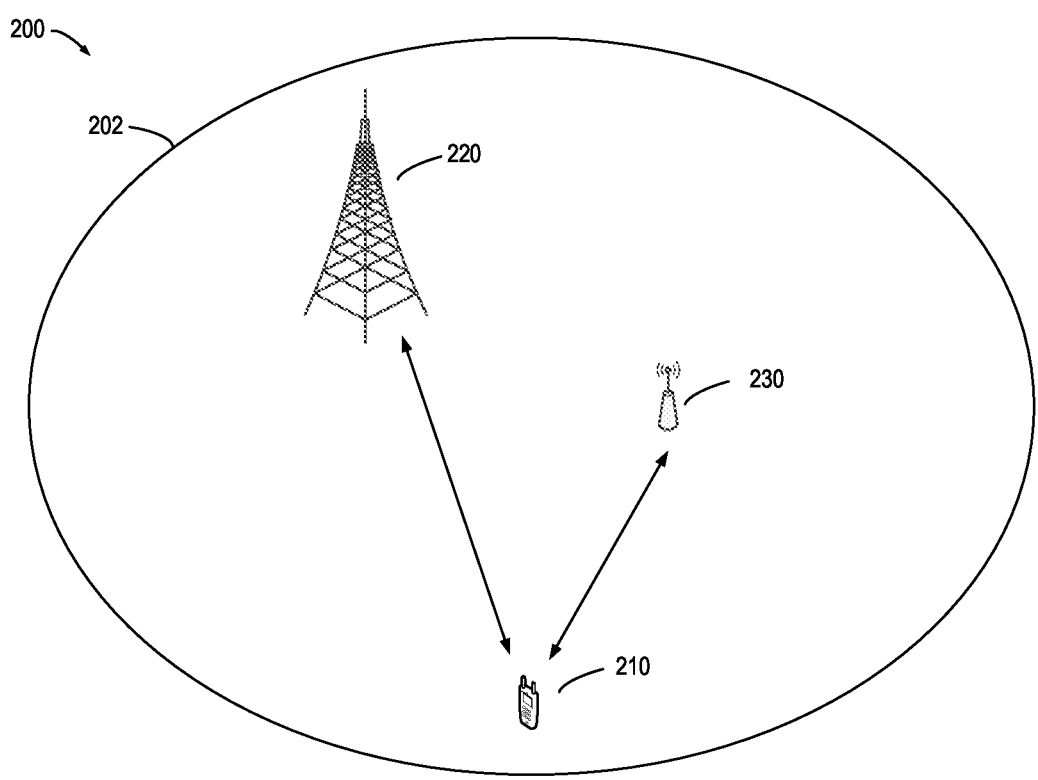
FIG. 2 illustrates an example communication network in which example embodiments of the present disclosure may be implemented.

FIG. 2 illustrates an example communication network 200 in which embodiments of the present disclosure can be implemented. As shown in FIG. 2, the communication network 200 includes a first device 210, a second device 220 and a third device 230. In some example embodiments, the first device 210 may be a terminal device, the second device 220 may be a network device serving the first device 110, and the third device 230 may be a secondary network device serving the first device 110. The second device 220 provides a serving cell 202 for the first device 210.

In the specific example of FIG. 2, the first device 210 may be configured with a MG configuration (such as, a MG pattern) indicating one or more of MGs. During the MGs, the first device 210 will suspend/disable its communication with its serving network device (i.e., the second device 220), while perform measurement on a carrier/frequency the same as or different from that of the serving network device. Further, there may be multiple BWPs configured in the communication network 200, where only one UP-DL BWM or one BWM-pair is active and the others are inactive. The second device 220 may switch BWP by transmitting a message (such as, a RRC message, a DCI command message (PDCCH order), a SIB, a MAC CE and the likes) to the first device 210.

In addition, in the specific example of FIG. 2, the first device 210 has a capability of carrier aggregation (CA). As shown in FIG. 2, the first device 210 may communicate with the second device 220 and the third device 230 simultaneously. In this event, the first device 210 may be referred to as a primary network device and the third device 230 may be referred to as a secondary network device.

It is to be understood that communications in the communication network 200 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

It is further to be understood that the numbers, connection relationships and types of first, second and third devices as shown in FIG. 2 are only for the purpose of illustration without suggesting any limitations. The communication network 200 may include any suitable number and type of first, second and third devices adapted for implementing embodiments of the present disclosure. Further, it is also to be understood that in some examples, only the homogeneous network deployment or only the heterogeneous network deployment may be included in the communication network 200.

Example embodiments of the present disclosure will be described in detail below with reference to the accompanying drawings.

Figure 3:
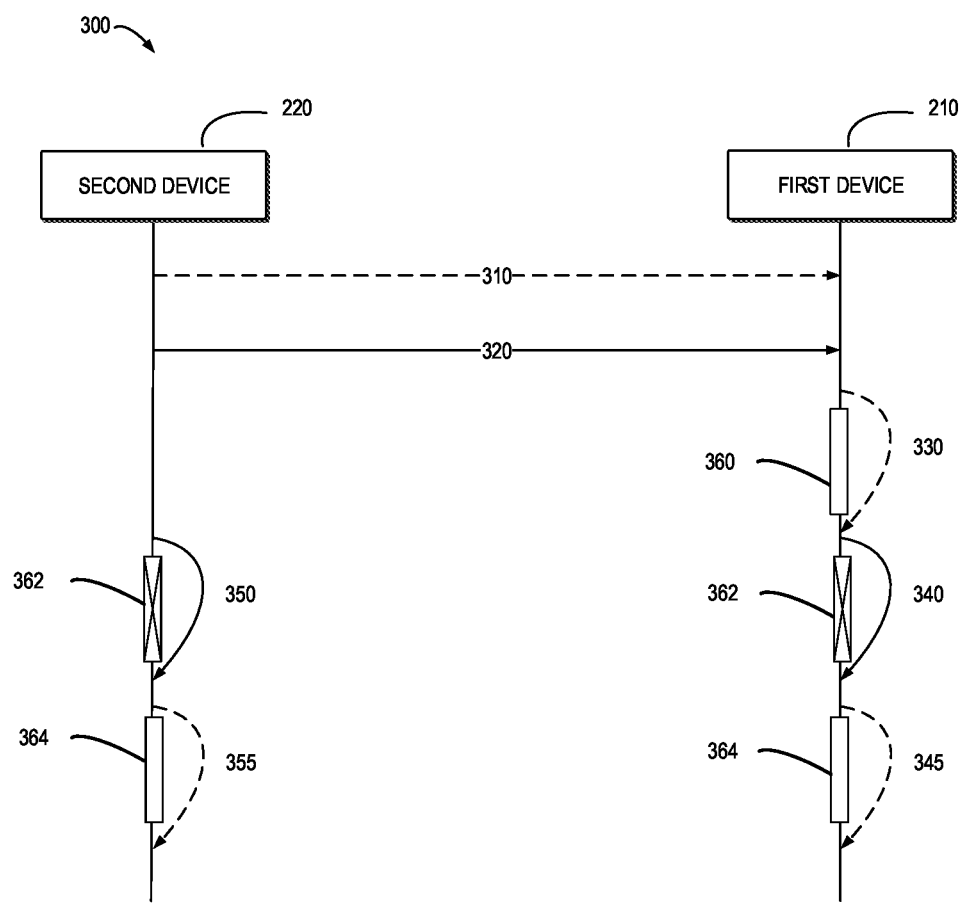
FIG. 3 illustrates a signaling flow illustrating an example process for activation of MG configuration according to some embodiments of the present disclosure.

Reference is now made to FIG. 3, which shows a signaling flow 300 for activation of MG configuration according to some embodiments of the present disclosure. For the purpose of discussion, the signaling flow 300 will be described with reference to FIG. 2. The signaling flow 300 may involve a first device 210 and a second device 220. In the specific example of FIG. 3, the first device 210 is a terminal device and the second device 220 is a serving network device of the first device 210.

For ease of discussion, some terms used in the following description are listed as below:
  first time point (also referred to as "P1"): a time point of reception of the message for switching BWP;
  second time point (also referred to as "P2"): an ending time point of a time window for processing the message for switching BWP;
  third time point (also referred to as "P3"): a starting time point of a MG;
  fourth time point (also referred to as "P4"): an ending time point of a MG;
  time window for processing the message for switching BWP (also referred to as "[P1, P2]"): including time for receiving and parsing the message, switching the BWP, and applying the MG configuration. Optionally, the time window may also include some time margin. In one example, the time window for processing the message for switching BWP at least comprises the $T_{BWPswitchDelay}$ (defined in the wireless standards) and the time to apply the MG configuration; and Unless the context clearly indicates otherwise, the time length of the time window can be obtained/determined/known by both of the first device 210 and the second device 220 (for example, the time length of the time window is defined/configured/stipulated by the wireless standards, the network operator or the service provider);

interval between a time window for processing the message for switching BWP and the MG (also referred to as "[P2, P3]"): from the second time point (P2) to the third time point (P3);

term "MG configuration" used in the present refers to any configuration relating to MG and/or MG pattern. Further, "MG configuration" may be represented any suitable manner, such as, an information element in a RRC message, a field in a DCI message and so on.

In addition, in the present disclosure, operations of "delaying to apply a MG" and "skipping/dropping a MG" are equivalent to each other, which refers to that the first device 210 is not expected to enable a MG to perform measurement during the MG while a transmission between the first device 210 and the second device 220 is enabled.

Additionally, in the present disclosure, operation "delaying an activation of the MG configuration" refers to that the first device 210 is not expected to enable a MG to perform measurement during the MG while a transmission between the first device 210 and the second device 220 is enabled.

Additionally, as all of the operations of "delaying an activation of the MG configuration", "delaying to apply a MG" and "skipping/dropping a MG" can achieve same technical effect that the first device 210 is not expected to enable a MG to perform measurement during the MG while a transmission between the first device 210 and the second device 220 is enabled, one of the above operations may be replaced with the others of the above operation. For example, the operation "delaying an activation of the MG configuration within a time period" may be replaced with operations "delaying to apply MG(s) within a time period" and "skipping/dropping a MG within a time period". Similarly, operations "delaying to apply MG(s)" and "skipping/dropping MG(s)" may be replaced with "delaying an activation of the MG configuration within a time period at least comprising the corresponding MG(s)".

It is to be understood that all the MGs discussed herein refers to those that occurs after receiving the message for switching BWP (i.e., the first time point, P1).

In addition, in the following description, examples of message type (such as "RRC message", "DCI command message (PDCCH order)", "MAC CE" and "SIB") are only for the purpose of illustration without suggesting any limitations. In other example embodiments, any suitable message types may be used for the interaction between the first device 210 and the second device 220.

In operation, the first device 210 receives 320 a message for switching the first device 210 to a BWP, where the message triggers the first device 210 to activate a MG configuration (such as, a MG pattern), and the MG configuration indicates one or more MGs. The message may be represented as any suitable message type. In one example, the message is a DCI command message (PDCCH order). In another example, the message may be a RRC message, or a MAC CE.

In addition, in some example embodiments, the second device 220 may configure the MG configuration to be activated to the first device 210. In one example, the second device 220 configures the MG configuration through the message for switching BWP. In another example, the second device 220 transmits 310 a further message to the first device 210, where the further message comprises at least one MG configuration corresponding to respective BWPs configured in the serving cell. The further message may be transmitted at any suitable time points, such as, prior to or together with the message for switching BWP. In one example, the second device 220 transmits the further message comprising the MG configuration after the message for switching. In another example, the second device 220 transmits the further message comprising the MG configuration, where the measurement gap configuration is pre-configured before the message for switching BWP. Alternatively, in another example, the MG configuration may be pre-defined by some wireless communication organizations (such as, enhancements for MG configuration in 3GPP Rel-17), which means that both the first device 210 and the second device 220 can pre-know the MG configuration.

In some example embodiments, the first device 210 processes 330 the message during time window 360. In addition, the first device 210 delays 340 to activate at least one MG. Correspondingly, the second device 220 enables 350 a transmission with the first device 210 during at least one MG. In the specific example of FIG. 3, the first device 210 delays to activate 340 the MG 362, and the second device 220 enables 350 a transmission with the first device 210 during MG 362.

Further, the first device 210 and the second device 220 may apply/resume the subsequent MG(s), such as the regular measurement at the first device 210 may be performed. As shown in the specific example of FIG. 3, the first device 210 applies 345 the MG 364 and the second device 220 disables 355 the transmission with the first device 210 during MG 364.

In this way, the first device 210 and the second device 220 may control when to apply the MG, such that the MG will not start too early.

In addition, in some example embodiments, the second device 220 may transmit an indication to the first device 210, where the indication is used for enabling the functionality in the first device 210 to delay to apply at least one MG. In some example embodiments, the indication is comprised in the message for switching BWP. In some other example embodiments, the second device 220 may transmit the indication via a further message (such as, a RRC message, DCI command message (PDCCH order) or MAC CE).

In this way, the second device 220 may control whether the first device 210 is allowed to delay to apply at least one MG.

In addition, in some example embodiments, the first device 210 may indicate an additional delay required to activate the MGs when receiving the message for switching BWP. For example, the first device 210 may transmits an indication to the second device 220, where the indication indicating that the first device 210 has a capability of delaying to apply the MG configuration. In this way, in case that the first device 210 enabling the functionality of delaying to apply at least one MG, the second device 220 may be informed at the earliest time.

In addition, operations of "delaying to apply at least one MG" of the first device 210 and "enabling a transmission with the first device 210 during at least one MG" of the second device 220 may be performed based on one or more conditions, rules, policies or parameters.

In one example, the first device 210 may delay to activate at least one MG if a condition/rule/policy for delaying the activation of MG is met, and the first device 210 activates the subsequent MGs if the condition/rule/policy for delaying the activation of the MG configuration is not met any more. Correspondingly, the second device 220 enables a transmission with the first device 210 during at least one MG if a condition/rule/policy for delaying the activation of MG is met, and the second device 220 disables a transmission with the first device 210 during at least one MG if the condition/rule/policy for delaying the activation of the MG configuration is not met any more.

In another example, the first device 210 may delay to activate at least one MG based on one or more parameters, while the second device 220 also may enables the transmission with the first device 210 based on one or more corresponding parameters. For instance, the second device 220 may indicate the time period within which the UE shall delay the activation of at least one MG upon reception of the BWP switch message. Optionally, the second device 220 may indicate additional time period within which the UE shall delay the activation of at least one MG after processing the BWP switch message i.e. $T_{BWPswitchdelay}$.

In some embodiments, the one or more parameters may be determined by the second device 220 first, and then transmits to the first device 210 by the second device 220. In one example, the second device 220 transmits the one or more parameters through the message for switching BWP. In another example, the second device 220 transmits the one or more parameters through a further message comprising the one or more parameters (such as, a RRC message, DCI command message (PDCCH order) SIB, MAC CE and the likes).

Alternatively, in some embodiments, the first device 210 and the second device 220 may determine the one or more parameters by themselves, respectively.

In one example, the first device 210 and the second device 220 determine the one or more parameters from a pre-defined configuration applied to the first device 210 and the second device 220. For example, the one or more parameters may be pre-defined by some wireless communication organizations (such as, enhancements for MG configuration in 3GPP Rel-17), which means that both the first device 210 and the second device 220 may store the one or more parameters in a locally configuration file or a computer program.

In another example, the first device 210 and the second device 220 may determine the one or more parameters by using a same rule/police.

Further, there are many factor may be used for determining the one or more parameters. By way of example rather than limitation, example factors may be a service associated with the at least one parameter, the bandwidth part to be switched, a capability of the first device 210 (such as, the type of the first device 210, the processing capability of the first device 210 or the performance of the first device 210 and the likes).

In addition, if the BWP is associated with a plurality of component carriers, the second device 220 may further determines the value of the timer based on the number of plurality of component carriers. Alternatively, or in addition, the second device 220 may further determine the value of the timer based on a scaling factor indicating an incremental delay for each additional component carrier involved in the switch of the BWP.

Now, reasons for why the number of the plurality of component carriers and the scaling factor may be used as factors for determining the one or more parameters are discussed as below.

In case that the switch of the BWP is associated with a plurality of component carriers, the delay for single component carrier is represent as $T_{BWPswitchDelay}$. Further, the parameter $T_{BWPswitchDelay}$ should be based on the smallest sub-carrier space (SCS) among SCSs corresponding to all of the involved component carriers before and after BWP switch. The delay for multiple component carriers may be represent as:

$$T_{MultipleBWPswitchDelay} = T_{BWPswitchDelay} + D^*(N-1) \qquad \text{Equation (1)}$$

Where parameter D is scaling factor indicating an incremental delay for each additional component carrier involved in the switch of the BWP. In some example embodiments, parameter D refers to an incremental delay for each additional component carrier and depends on the capability of the first device 210 (such as, bwp-SwitchingMultiCCs-r16)

In some example embodiments, parameter bwp-SwitchingMultiCCs-r16 indicates whether the first device 210 supports incremental delay for DCI and timer based active BWP switching on multiple CCs simultaneously. The capability signalling comprises of the following: type1-r16 indicates the delay value for type 1 BWP switching delay and has values of {100 us, 200 us}; and type2-r16 indicates the delay value for type 2 BWP switching delay and has values of {200 us, 400 us, 800 us, 1000 us}.

Parameter N relates to the number of the plurality of component carriers. In some example embodiments, if the first device 210 is capable of per-FR gap and no BWP switch involves SCS change, N is the number of component carriers in same FR. In some other example embodiments, if the first device 210 is not capable of per-FR gap or the BWP switches on any component carrier involves SCS changing, N is the number of component carriers undergoing simultaneous BWP switch.

Through the above discussion, in case that the switch of the BWP is associated with a plurality of component carriers, the number of the plurality of component carriers and the scaling factor may be used as factors for determining the one or more parameters.

Additionally, in some example embodiments, the one or more parameter is specific to a particular MG configuration of concurrent MG configurations. Alternatively, in some other example embodiments, the one or more parameter is shared by a plurality of concurrent MG configurations of the first device 210.

It is to be understood that the conditions, rules, policies or parameters may be defined with any suitable physical meaning which may be used by the first device 210 to perform delaying to apply at least one MG or be used by the second device 220 to perform enabling the transmission with the first device 210 during at least one MG. In some example embodiments, the conditions, rules, policies or parameters may refer to the any relationships among P1, P2, P3 and P4, or any relationships between the time window for processing the message and the MG. In one example, the conditions, rules, policies or parameters may indicate some thresholds for at least one of the following: a difference of P3–P2 (if P3>P2) or P2–P3 (if P2>P3), a difference of P3–P1, a difference of P4–P2, an interval between the time window and the MG, an overlapped duration of the time window and the MG and the likes. In another example, the conditions, rules, policies or parameters may indicate a time period for delaying the activation of the MG configuration.

Further, the above conditions, rules, policies or parameters can be used separately or in combination, and the one or more parameters may be a positive number or a negative number according to its specific physical meaning.

By way of example rather than limitation, example embodiments for "delaying to apply at least one MG"/ "enabling a transmission with the first device 210 during at least one MG" will be described in the following.

Example 1

In some example embodiments, the first device 210 delays to apply a MG if a time window (i.e., [P1, P2]) for processing the message for switching BWP is at least partly overlapped with the MG (i.e., [P3, P4]). Correspondingly, the second device 220 enables the transmission with the first device 210 during respective MG.

Figure 4A:
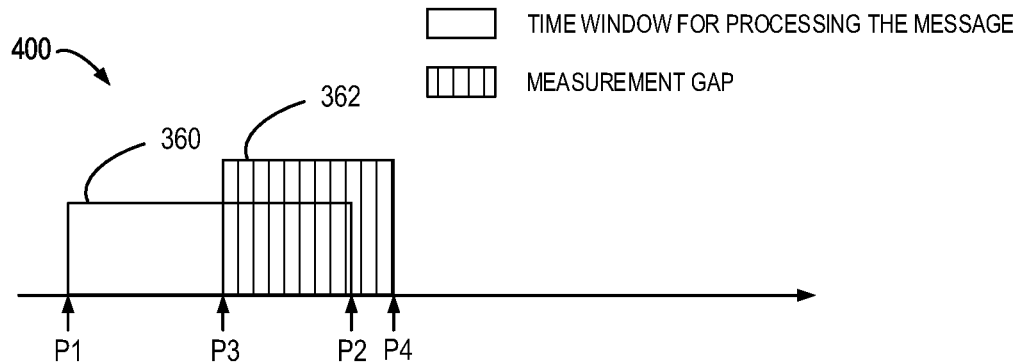
FIGS. 4A to 4C illustrates block diagrams of example correspondences between the time window for processing the message and the MG according to some example embodiments of the present disclosure.
Figure 4B:
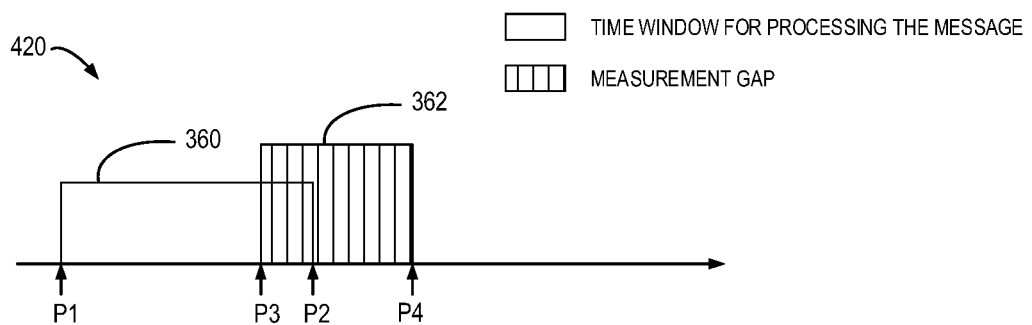

Reference is now made to FIGS. 4A and 4B, which shows example correspondences 400 and 420 between the time window 360 and the MG 362. As shown in FIGS. 4A and 4B, the time window 360 is at least partly overlapped with the MG 362. In this event, the first device 210 delays to apply the MG 362 and the second device 220 enables the transmission with the first device 210.

Example 2

In addition, rather than delaying to apply the MG directly, the first device 210 and the second may perform different operations according to different scenarios when the time window 360 is at least partly overlapped with the MG 362. Specifically, the first device 210 delays to apply the MG if an overlapped duration of the time window and the MG is below an overlap threshold (that is, P2-P3< or <=overlap threshold). Additionally, the first device 210 applies the MG if the overlapped duration of time window for processing the message and the MG is above the overlap threshold (that is, P2-P3> or >=overlap threshold). Correspondingly, the second device 220 enables the transmission with the first device 210 if the overlapped duration of the time window and the MG is below the overlap threshold, and disables the transmission with the first device 210 if the overlapped duration is above the overlap threshold.

Reference is now made to FIGS. 4A and 4B again. As shown in FIG. 4A, the overlapped duration of time window 360 and the MG 362 is above the overlap threshold. In this event, the first device 210 the first device 210 applies the MG 362 and the second device 220 disables the transmission with the first device 210. While in FIG. 4B, the overlapped duration of time window 360 and the MG 362 is below the overlap threshold. In this event, the first device 210 delays to apply the MG 362 and the second device 220 enables the transmission with the first device 210.

Example 3

In some example embodiments, the first device 210 delays to apply a MG if an interval (i.e., [P2, P3]) between the time window (i.e., [P 1, P2]) and the MG (i.e., [P3, P4]) is below an interval threshold. Correspondingly, the second device 220 enables the transmission with the first device 210 during the respective MG.

Figure 4C:
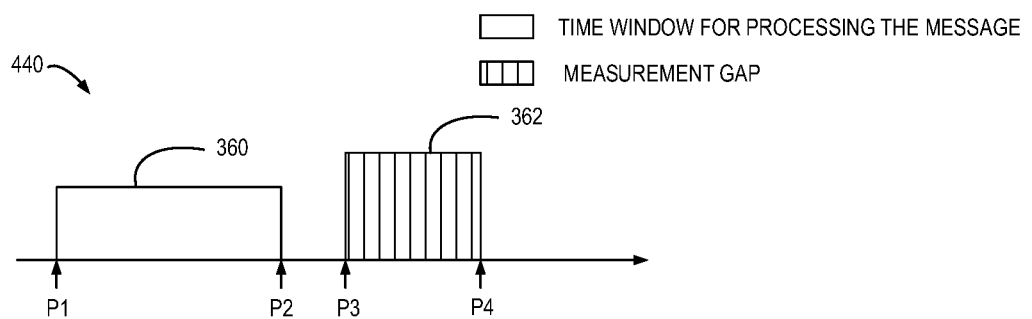

Reference is now made to FIG. 4C, which shows example correspondences 440 between the time window 360 and the MG 362. As shown in FIG. 4C, the interval between the time window 360 and the MG 362 is below the interval threshold. In other words, the third time point (i.e., P3) is close to the second time point (i.e, P2), or the MG starts too early. In this event, the first device 210 delay to apply the MG 362 and the second device 220 enables the transmission with the first device 210.

For better understanding, one example procedure is described in the following.

The interval threshold is obtained by the first device 210 (from the second device 220 or determined by itself). When the first device 210 receives the message for switching BWP (which also triggers the first device 210 to activate the MG configuration), the first device 210 may determines whether to delay to apply the MG. In one example, the first device 210 calculates the time difference between the third time point (i.e., P3) and the second time point (i.e., P2). If P3-P2< or <=interval threshold, the first device 210 delay to apply the MG, while the first device 210 performs normal communication behavior with second device 220. As for the following MG(s), if P3-P2> or >=interval threshold, the first device 210 resumes normal MG behavior.

Example 4

In some example embodiments, the first device 210 delays the activation of the measurement gap configuration within a time period and the second device 220 enables a transmission with first device 210 within a time period. Additionally, the starting point to the time period is the time point of reception of the message (i.e., the first time point, P1) or the ending time point of the time window (i.e., the second time point, P2). The above procedure may be implemented by using a timer. As one example implement, the first device 210 starts a timer at a time point of reception of the message for switching the BWP (i.e., the first time point, P1) or an ending time point of the time window (i.e., the second time point, P2). Then, the first device 210 delays the activation of the MG configuration if the timer is not expired and activates of the MG configuration if the timer is expired. Correspondingly, the second device 220 starts the timer at a time point of P1 or P2. Then, the second device 220 enables the transmission with the first device 210 during at least one MG if the timer is not expired and disables the transmission with the first device 210 during at least one MG if the timer is expired.

In this way, the first device 210 and the second 220 may avoid the occurrence of scenario where the first MG starts to early.

For better understanding, one example procedure is described in the following.

Upon receiving the message for switching BWP (for example, at slot "n"), first device 210 obtains information about the time period, within which the first device 210 delays to apply the MG.

In this specific example, a timer is used by the first device 210 and the second device 220. For example, the second device 220 may configure one timer to the first device 210 to delay to apply or to block the MG configuration (such as, a MG pattern). In some example embodiments, the value of the timer can be sent to the first device 210 via messages, such as, a RRC message (for example, in MG pattern pre-configuration), a SIB, or the message for switching BWP (for example, DCI command message (PDCCH order)). The timer stars at the first time point (P1) or the second time point (P2). During the timer running, no MG is active at both the first device 210 and the second device 220.

In some example embodiments, the value of the timer (referred to as "$T_{guard\_time}$" sometimes) may be different due to different services, different BWPs, or different capabilities of the first device 210.

In one example, if the BWP to be activated is associated with a single component carrier, the value of the timer may be defined as below:

$$T_{guard\_time} = n + T_{BWPswitchDelay} \quad \text{Equation (2)}$$

In another example, if the BWP to be activated is associated with a plurality of component carriers (for example, a DCI based BWP which triggers the activation of a MG pattern, where the first device 210 needs to switch to multiple component carriers), the value of the timer may be defined as below:

$$T_{guard\_time} = n + T_{MultipleBWPswitchDelay} \quad \text{Equation (3)}$$

Parameter $T_{MultipleBWPswitchDelay} = T_{BWPswitchDelay} + D*(N-1)$ has the same physical meaning as discussed above. Further, parameter "n" is the slot of receiving the message for switching BWP. Parameter $T_{BWPswitchDelay}$ is a BWP switching delay for single component carrier (may be defined by the wireless communication organization. Further, parameter $T_{BWPswitchDelay}$ may be defined depending on UE capability (such as, bwp-SwitchingDelay) of the first device 210.

In addition, if the BWP switch is associated with multiple component carriers, the parameter $T_{BWPswitchDelay}$ should be based on the smallest sub-carrier space (SCS) among SCSs corresponding to all of the involved component carriers before and after BWP switch. In this specific example, the network device 220 would not need to consider the BWP delay time for Type1 and Type2 UE BWP switch and whether the MG will be activated after the BWP.

Parameter D is scaling factor indicating an incremental delay for each additional CC involved in the switch of the bandwidth part. Parameter N relates to the number of the plurality of component carriers.

In some example embodiments, in concurrent MG patterns configured scenario (i.e., the first device 210 can have more than one active MG pattern in parallel, the timer for delaying the activation of the MG configuration and the parameter $T_{guard\_time}$ can be set specific to each MG pattern, or the be set as a common setting for all MG patterns in parallel.

Optionally, in some example embodiments, parameter $T_{guard\_time}$ may comprise some time margin according to the specific requirements or application scenarios.

Example 5

For some specific scenarios, the second device 220 does not know the value of the time window for processing the message for switching BWP (also referred to as "[P1, P2]"). For example, the value of the time window refers to actually time used by the first device 210 for processing the message. In this event, the second device 220 doesn't need to do calculation and just keeps scheduling the first device 210 including receiving transmissions. If the second device 220 receives any transmissions from the first device 210, the second device 220 enables starts normal data scheduling with the first device 210.

It is to be understood that the above examples are provided by way of example rather than limitation.

The example embodiments according to the present discourse give flexibility to the first device 210 and the second device 220. For example, the first device 210 and the second device 220 can set suitable threshold value to avoid impossible to schedule important signalling or service data in uplink and downlink after BWP switching, which was raised by the activated MG too close or even overlapping to BWP switching/activation time. Further, the example embodiments according to the present discourse can ensue the BWP switch delays are predictable, and the UE latency requirements are not impacted by potential adding/activation of MG patterns.

One Specific Example Embodiment

Figure 5:
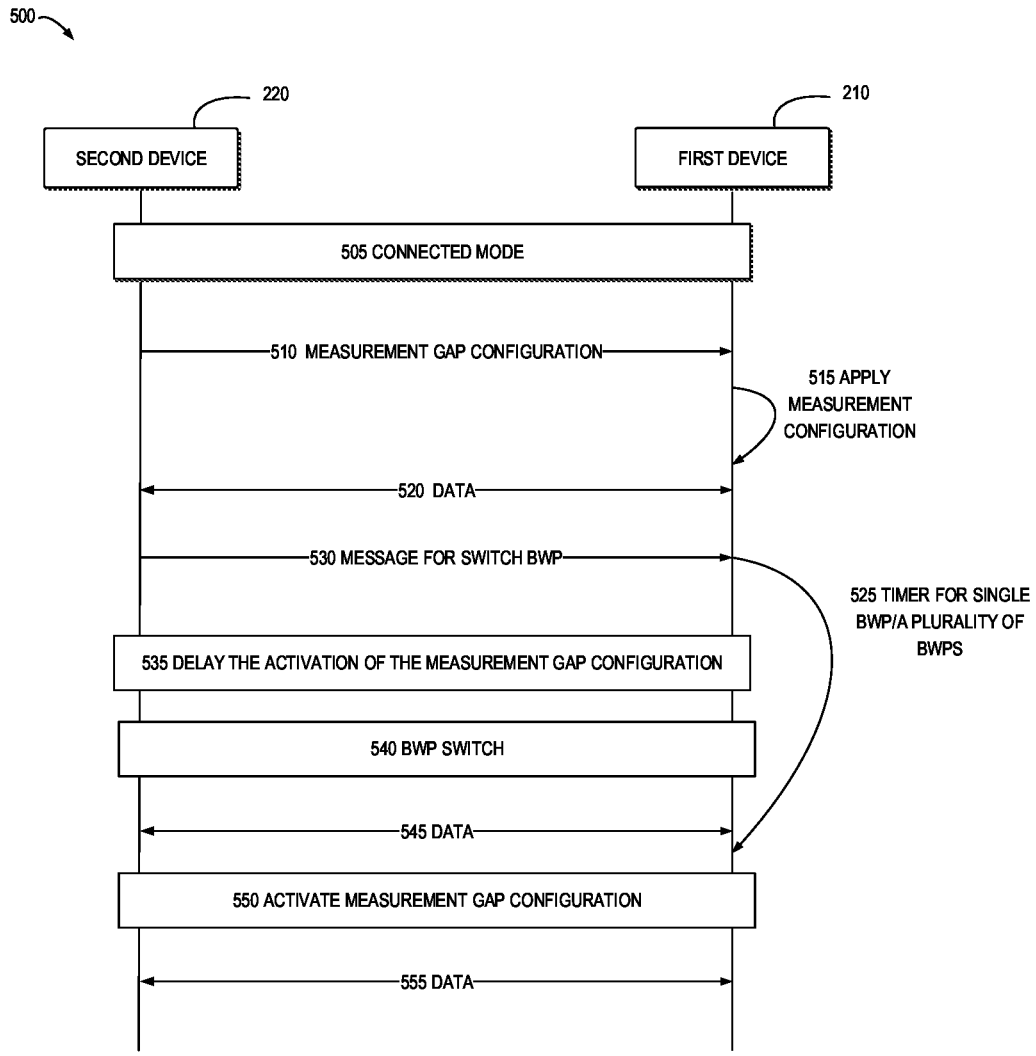
FIG. 5 illustrates a signaling flow illustrating an example process for activation of MG configuration according to some embodiments of the present disclosure.

Reference is now made to FIG. 5, which shows a signaling flow 500 for activation of pre-configuration MG by using a timer. For the purpose of discussion, the signaling flow 500 will be described with reference to FIG. 2. The signaling flow 3500 may involve a first device 210 and a second device 220. In the specific example of FIG. 5, the first device 210 is a terminal device and the second device 220 is a serving network device of the first device 210.

In the specific example of FIG. 5, the first device 210 enters 505 into a connected mode. The second device 220 transmits 510 MG configuration to the first device 210. The MG configuration may include one or more pre-configured MG configurations (such as, MG Patterns).

In the specific example of FIG. 5, the first device 210 applies 515 the MG configuration. After that, a data transmission may be performed 520 between the first device 210 and the second device 220.

The second device 220 transmits 530 a message for switching the BWP to the first device 210, where the message may indicate the pre-configured MG configuration is to be activated (or deactivated).

After receiving the message for switching the BWP, the first device 210 will start 525 a timer (referred to as "$T_{guard\_timer}$" for ease of discussion). The value of the $T_{guard\_timer}$ depends on whether the BWP message for switching the BWP includes switching of one single BWP or switching of multiple BWP (such as, a plurality of component carriers).

The first device 210 disables 535 the activation of the pre-configured MG configuration within the $T_{guard\_timer}$. Further, the first device 210 performs 540 normal BWP switch.

As the MG configuration is disabled within the $T_{guard\_timer}$, the first device 210 and the second device 220 can performs 545 data transmission after the first has switched to the new BWP.

Once the $T_{guard\_timer}$ expires, the first device 210 will enable/activate 550 the pre-configured MG configuration(s) and perform normal measurement during the MGs, and data transmission may be performed 555 beyond the MGs.

Alternatively, in case that the first device 210 is configured (or reconfigured) with one or more concurrent MG configurations (i.e. the first device 210 can have more than one active MG configuration in parallel). For this specific scenario, the message (such as, RRC configurations) adding and/or removing one or more active MG patterns (as part of concurrent MGPs being supported) will trigger the $T_{guard\_timer}$ which disables the MG configurations on the first device 210 (and the second device 220) side for a period of $T_{guard\_timer}$.

Figure 6:
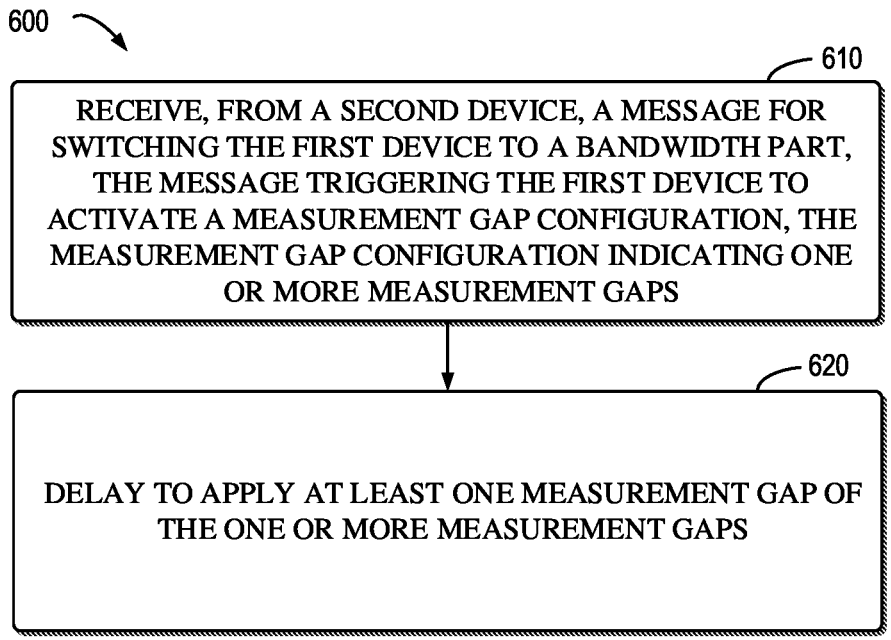
FIG. 6 illustrates a flowchart of an example method performed by the first device according to some embodiments of the present disclosure.

FIG. 6 shows a flowchart of an example method 600 implemented at a first device 210 in accordance with some example embodiments of the present disclosure. For the purpose of discussion, the method 600 will be described from the perspective of the first device 210 with respect to FIG. 2.

At block 620, the first device 210 receives a message for switching the first device 210 to a bandwidth part from a second device 220. The message triggers the first device 210 to activate a measurement gap configuration. The MG configuration indicates one or more measurement gaps.

At block 620, the first device 210 delays to apply at least one measurement gap of the one or more measurement gaps.

In some example embodiments, the first device 210 delays to apply a measurement gap of the one or more measurement gaps if a time window for processing the message by the first device 210 is at least partly overlapped with the measurement gap.

In some example embodiments, the first device 210 delays to apply the at least one measurement gap based on at least one parameter.

In some example embodiments, the at least one parameter is an interval threshold. The first device 210 delays to apply a measurement gap of the one or more measurement gaps if an interval between a time window for processing the message by the first device 210 and the measurement gap is below the interval threshold.

In some example embodiments, the first device 210 determines the interval based on one of the following: a time point of reception of the message to a starting time point of the measurement gap, or an ending time point of the time window to the starting time point of the measurement gap. The first device 210 delays to apply the measurement gap if the interval is below the interval threshold.

In some example embodiments, the at least one parameter is an overlap threshold. The first device 210 delays to apply a measurement gap of the one or more measurement gaps if an overlapped duration of a time window for processing the message and the measurement gap is below the overlap threshold and applies the measurement gap if the overlapped duration is above the overlap threshold.

In some example embodiments, the at least one parameter is a time period and the starting point of the time period is a time point of reception of the message or an ending time point of a time window for processing the message. The first device 210 delays the activation of the measurement gap configuration within the time period.

In some example embodiments, at least one parameter is obtained from the second device 220 or determined by the first device 210.

In some example embodiments, the at least one parameter is determined based on at least one of the following: a service associated with the at least one parameter, the bandwidth part to be switched, a capability of the first device 210, or a pre-defined configuration applied to the first device 210 and the second device 220.

In some example embodiments, if the switch of the bandwidth part is associated with a plurality of component carriers, the at least one parameter is further determined based on at least one of the following: the number of the plurality of component carriers; or a scaling factor indicating an incremental delay for each additional component carrier involved in the switch of the bandwidth part.

In some example embodiments, the at least one parameter is specific to a particular measurement gap configuration of concurrent measurement gap configurations, or is shared by a plurality of concurrent measurement gap configurations of the first device 210.

In some example embodiments, the measurement gap configuration is configured to the first device 210 by the second device 220 through at least one of the following: the message for switching the first device 210 to the bandwidth part, wherein the message comprises the measurement gap configuration, a further message comprising the measurement gap configuration transmitted after the message for switching the first device 210 to the bandwidth part, or a further message comprising the measurement gap configuration pre-configured before the message for switching the first device 210 to the bandwidth part.

In some example embodiments, the first device 210 delays to apply the measurement gap if the first device 210 receives, from the second device 220, an indication for enabling the functionality in the first device 210 to delay to apply the at least one measurement gap.

In some example embodiments, the first device 210 is a terminal device and the second device 220 is a network device.

Figure 7:
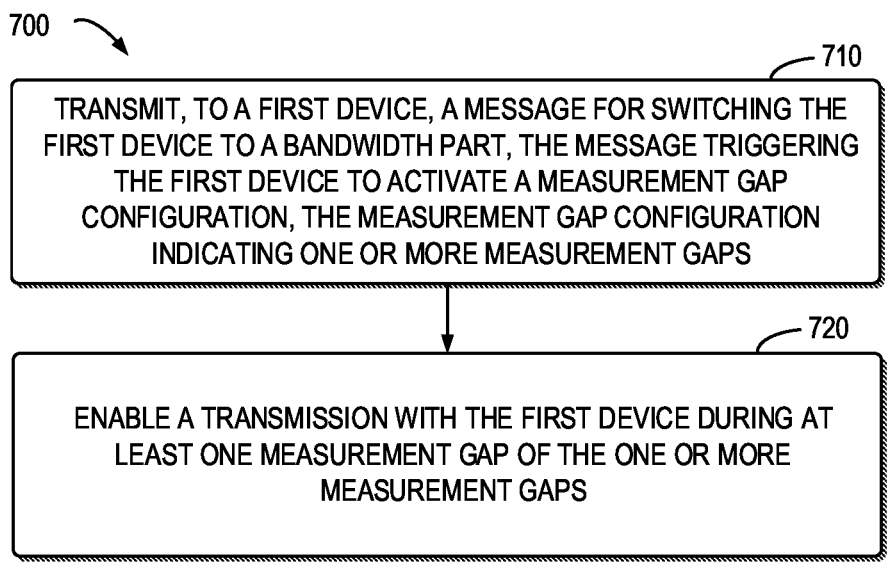
FIG. 7 illustrates a flowchart of an example method performed by the second device according to some embodiments of the present disclosure.

FIG. 7 shows a flowchart of an example method 700 implemented at a second device 220 in accordance with some example embodiments of the present disclosure. For the purpose of discussion, the method 700 will be described from the perspective of the second device 220 with respect to FIG. 2.

At block 710, the second device 220 transmits, to a first device 210, a message for switching the first device 210 to a bandwidth part. The message triggers the first device 210 to activate a measurement gap configuration. The measurement gap configuration indicating one or more measurement gaps.

At block 720, the second device 220 enables a transmission with the first device 210 during at least one measurement gap of the one or more measurement gaps.

In some example embodiments, the second device 220 enables the transmission with the first device 210 if a time window for processing the message by the first device 210 is at least partly overlapped with the measurement gap, or receives a transmission from the first device 210 during the measurement gap.

In some example embodiments, the second device 220 enables the transmission with the first device 210 based on at least one parameter.

In some example embodiments, the at least one parameter is an interval threshold. The second device 220 enables the transmission with the first device 210 if an interval between a time window for processing the message by the first device 210 and the measurement gap is below the interval threshold.

In some example embodiments, the second device 220 determines the interval based on one of the following: a time point of reception of the message to a starting time point of the measurement gap, or an ending time point of the time window to the starting time point of the measurement gap. The second device 220 enables the transmission with the first device 210 if the interval is below the interval threshold.

In some example embodiments, the at least one parameter is an overlap threshold. The second device 220 enables the transmission with the first device 210 if an overlapped duration of a time window for processing the message and the measurement gap is below the overlap threshold; and disables the transmission with the first device 210 if the overlapped duration is above the overlap threshold.

In some example embodiments, the at least one parameter is a time period and the starting point of the time period is a time point of reception of the message or an ending time point of a time window for processing the message. The second device 220 enables the transmission with the first device 210 within the time period.

In some example embodiments, the second device 220 transmits at least one parameter to the first device 210.

In some example embodiments, the at least one parameter is determined based on at least one of the following a service associated with the at least one parameter, the bandwidth part to be switched, a capability of the first device 210, or a pre-defined configuration applied to first device 210 and the second device 220.

In some example embodiments, if the switch of the bandwidth part is associated with a plurality of component carriers, the at least one parameter is further determined based on at least one of the following the number of the plurality of component carriers; or a scaling factor indicating an incremental delay for each additional component carrier involved in the switch of the bandwidth part.

In some example embodiments, the at least one parameter is specific to a particular measurement gap configuration of concurrent measurement gap configurations, or is shared by a plurality of concurrent measurement gap configurations of the first device 210.

In some example embodiments, the second device 220 configures the measurement gap configuration to the first device 210 through at least one of the following: the message for switching the first device 210 to the bandwidth part, wherein the message comprises the measurement gap configuration, a further message comprising the measurement gap configuration transmitted after the message for switching the first device 210 to the bandwidth part, or a further message comprising the measurement gap configuration pre-configured before the message for switching the first device 210 to the bandwidth part.

In some example embodiments, the second device 220 transmits, to the first device 210, an indication for enabling the functionality in the first device 210 to delay to apply the at least one measurement gap.

In some example embodiments, the first device 210 is a terminal device and the second device 220 is a network device.

In some example embodiments, a first apparatus capable of performing any of the method 600 (for example, the first device 210) may comprise means for performing the respective operations of the method 600. The means may be implemented in any suitable form. For example, the means may be implemented in a circuitry or software module. The first apparatus may be implemented as or included in the first device 210.

In some example embodiments, the first apparatus comprises means for receiving, at a first apparatus and from a second apparatus, a message for switching the first apparatus to a bandwidth part, the message triggering the first apparatus to activate a measurement gap configuration, the measurement gap configuration indicating one or more measurement gaps. The first apparatus further comprises means for delaying to apply at least one measurement gap of the one or more measurement gaps.

In some example embodiments, means for delaying to apply the at least one measurement gap comprises: means for delaying to apply a measurement gap of the one or more measurement gaps if a time window for processing the message by the first apparatus is at least partly overlapped with the measurement gap.

In some example embodiments, means for delaying to apply the at least one the measurement gap comprises: means for delaying to apply the at least one measurement gap based on at least one parameter.

In some example embodiments, the at least one parameter is an interval threshold. Means for delaying to apply the at least one the measurement gap comprises: means for delaying to apply a measurement gap of the one or more measurement gaps if an interval between a time window for processing the message by the first apparatus and the measurement gap is below the interval threshold.

In some example embodiments, means for delaying to apply the measurement gap comprises: means for determining the interval based on one of the following: a time point of reception of the message to a starting time point of the measurement gap, or an ending time point of the time window to the starting time point of the measurement gap; and means for delaying to apply the measurement gap if the interval is below the interval threshold.

In some example embodiments, the at least one parameter is an overlap threshold. Further comprises mean for delaying to apply a measurement gap of the one or more measurement gaps if an overlapped duration of a time window for processing the message and the measurement gap is below the overlap threshold; and means for applying the measurement gap if the overlapped duration is above the overlap threshold.

In some example embodiments, wherein the at least one parameter is a time period and the starting point of the time period is a time point of reception of the message or an ending time point of a time window for processing the message. Means for delaying to apply the at least one measurement gap comprises: means for delaying the activation of the measurement gap configuration within the time period.

In some example embodiments, the at least one parameter is obtained from the second apparatus or determined by the first apparatus.

In some example embodiments, the at least one parameter is determined based on at least one of the following: a service associated with the at least one parameter, the bandwidth part to be switched, a capability of the first apparatus, or a pre-defined configuration applied to the first apparatus and the second apparatus.

In some example embodiments, if the switch of the bandwidth part is associated with a plurality of component carriers, the at least one parameter is further determined based on at least one of the following: the number of the plurality of component carriers; or a scaling factor indicating an incremental delay for each additional component carrier involved in the switch of the bandwidth part.

In some example embodiments, the at least one parameter is specific to a particular measurement gap configuration of concurrent measurement gap configurations, or is shared by a plurality of concurrent measurement gap configurations of the first apparatus.

In some example embodiments, the measurement gap configuration is configured to the first apparatus by the second apparatus through at least one of the following: the message for switching the first apparatus to the bandwidth part, wherein the message comprises the measurement gap configuration, a further message comprising the measurement gap configuration transmitted after the message for switching the first apparatus to the bandwidth part, or a further message comprising the measurement gap configuration pre-configured before the message for switching the first apparatus to the bandwidth part.

In some example embodiments, the first apparatus further comprises means for delaying to apply the measurement gap if the first apparatus receives, from the second apparatus, an indication for enabling the functionality in the first apparatus to delay to apply the at least one measurement gap.

In some example embodiments, the first apparatus is a terminal apparatus and the second apparatus is a network apparatus.

In some example embodiments, a second apparatus capable of performing any of the method 700 (for example, the second device 220) may comprise means for performing the respective operations of the method 700. The means may be implemented in any suitable form. For example, the means may be implemented in a circuitry or software module. The second apparatus may be implemented as or included in the second device 220.

In some example embodiments, the second apparatus comprises means for transmitting, at a second apparatus to a first apparatus, a message for switching the first apparatus to a bandwidth part, the message triggering the first apparatus to activate a measurement gap configuration, the measurement gap configuration indicating one or more measurement gaps. The second apparatus further comprises means for enabling a transmission with the first apparatus during at least one measurement gap of the one or more measurement gaps.

In some example embodiments, means for enabling the transmission with the first apparatus comprises: means for enabling the transmission with the first apparatus if: a time window for processing the message by the first apparatus is at least partly overlapped with the measurement gap, or receive a transmission from the first apparatus during the measurement gap.

In some example embodiments, means for enabling the transmission with the first apparatus comprises: means for enabling the transmission with the first apparatus based on at least one parameter.

In some example embodiments, the at least one parameter is an interval threshold. Means for enabling the transmission with the first apparatus comprises: means for enabling the transmission with the first apparatus if an interval between a time window for processing the message by the first apparatus and the measurement gap is below the interval threshold.

In some example embodiments, means for enabling the transmission with the first apparatus comprises: means for determining the interval based on one of the following: a time point of reception of the message to a starting time point of the measurement gap, or an ending time point of the time window to the starting time point of the measurement gap; and means for enabling the transmission with the first apparatus if the interval is below the interval threshold.

In some example embodiments, the at least one parameter is an overlap threshold. Means for enabling the transmission with the first apparatus comprises: means for enabling the transmission with the first apparatus if an overlapped duration of a time window for processing the message and the measurement gap is below the overlap threshold; and means for disabling the transmission with the first apparatus if the overlapped duration is above the overlap threshold.

In some example embodiments, the at least one parameter is a time period and the starting point of the time period is a time point of reception of the message or an ending time point of a time window for processing the message. Means for enabling the transmission with the first apparatus comprises: means for enabling the transmission with the first apparatus within the time period.

In some example embodiments, the second apparatus further comprises: means for transmitting at least one parameter to the first apparatus.

In some example embodiments, the at least one parameter is determined based on at least one of the following: a service associated with the at least one parameter, the bandwidth part to be switched, a capability of the first apparatus, or a pre-defined configuration applied to first apparatus and the second apparatus.

In some example embodiments, if the switch of the bandwidth part is associated with a plurality of component carriers, the at least one parameter is further determined based on at least one of the following: the number of the plurality of component carriers; or a scaling factor indicating an incremental delay for each additional component carrier involved in the switch of the bandwidth part.

In some example embodiments, the at least one parameter is specific to a particular measurement gap configuration of concurrent measurement gap configurations, or is shared by a plurality of concurrent measurement gap configurations of the first apparatus.

In some example embodiments, the second apparatus further comprises: means for configure the measurement gap configuration to the first apparatus through at least one of the following: the message for switching the first apparatus to the bandwidth part, wherein the message comprises the measurement gap configuration, a further message comprising the measurement gap configuration transmitted after the message for switching the first apparatus to the bandwidth part, or a further message comprising the measurement gap configuration pre-configured before the message for switching the first apparatus to the bandwidth part.

In some example embodiments, the second apparatus further comprises: means for transmitting, to the first apparatus, an indication for enabling the functionality in the first apparatus to delay to apply the at least one measurement gap.

In some example embodiments, wherein the first apparatus is a terminal apparatus and the second apparatus is a network apparatus.

Figure 8:
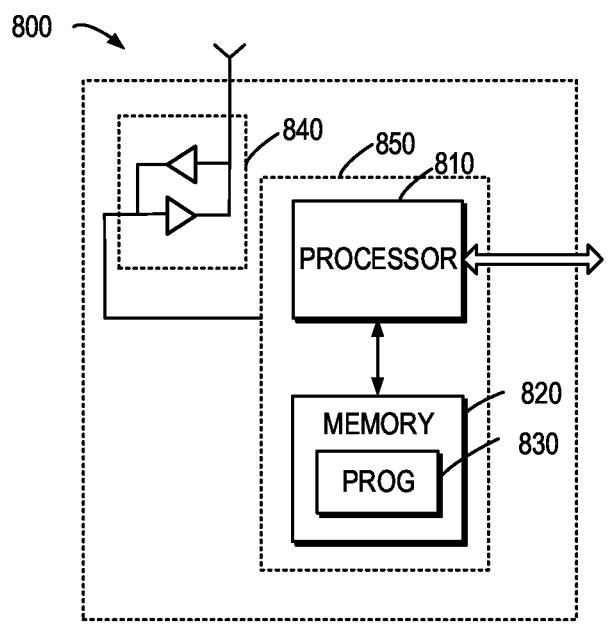
FIG. 8 illustrates a simplified block diagram of a device that is suitable for implementing example embodiments of the present disclosure.

FIG. 8 is a simplified block diagram of a device 800 that is suitable for implementing embodiments of the present disclosure. The device 800 may be provided to implement a communication device, for example, the first device 210 and the second device 220 as shown in FIG. 2. As shown, the device 800 includes one or more processors 810, one or more memories 820 coupled to the processor 810, and one or more communication modules 840 (such as, transmitters and/or receivers) coupled to the processor 810.

The communication module 840 is for bidirectional communications. The communication module 840 has at least one antenna to facilitate communication. The communication interface may represent any interface that is necessary for communication with other network elements.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The program 830 may be stored in the ROM 824. The processor 810 may perform any suitable actions and processing by loading the program 830 into the RAM 820.

The embodiments of the present disclosure may be implemented by means of the program 830 so that the device 800 may perform any process of the disclosure as discussed with reference to FIG. 6 or 7. The embodiments of the present disclosure may also be implemented by hardware or by a combination of software and hardware.

Figure 9:
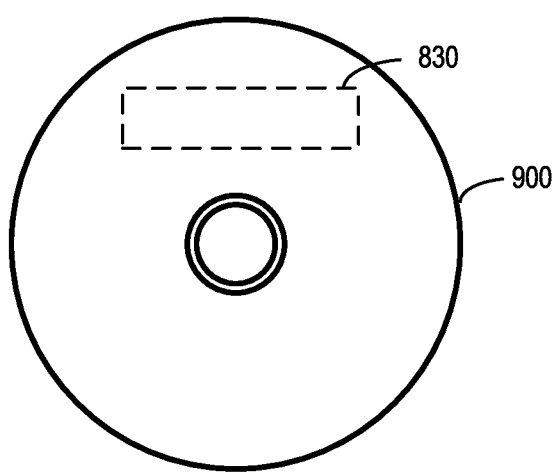
FIG. 9 illustrates a block diagram of an example computer readable medium in accordance with example embodiments of the present disclosure.

In some embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and the like. FIG. 9 shows an example of the computer readable medium 900 in form of CD or DVD. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600 or 700 as described above with reference to FIG. 6 or 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising: at least one processor; and at least one memory including computer program code; wherein the at least one memory and the computer program code are configured to, with the at least one processor, cause the first device to:

receive, from a second device, a message for bandwidth part switching for the first device, the message triggering the first device to activate a measurement gap configuration, the measurement gap configuration indicating one or more measurement gaps;

delay to apply at least one measurement gap of the one or more measurement gaps based on at least one parameter, wherein the at least one parameter is an interval threshold; and cause the first device to delay to apply a measurement gap of the one or more measurement gaps if:
an interval between a time window for processing the message by the first device and the measurement gap is below the interval threshold.

2. The first device of claim 1, wherein the at least one memory and the computer program code are configured to, with the at least one processor, cause the first device to delay to apply the at least one measurement gap by: delaying to apply a measurement gap of the one or more measurement gaps if: a time window for processing the message by the first device is at least partly overlapped with the measurement gap.

3. The first device of claim 1, wherein the at least one memory and the computer program code are configured to, with the at least one processor, cause the first device to delay to apply the measurement gap by: determining the interval based on a time point of reception of the message to a starting time point of the measurement gap, or based on an ending time point of the time window to the starting time point of the measurement gap; and delaying to apply the measurement gap if the interval is below the interval threshold.

4. The first device of claim 1, wherein the at least one parameter is an overlap threshold, and wherein the at least one memory and the computer program code are configured to, with the at least one processor, cause the first device to delaying to apply the at least one measurement gap by: delaying to apply a measurement gap of the one or more measurement gaps if an overlapped duration of a time window for processing the message and the measurement gap is below the overlap threshold; and applying the measurement gap if the overlapped duration is above the overlap threshold.

5. The first device of claim 1, wherein the at least one parameter is a time period and the starting point of the time period is a time point of reception of the message or an ending time point of a time window for processing the message; and wherein the at least one memory and the computer program code are configured to, with the at least one processor, cause the first device to delaying to apply the at least one measurement gap by: delaying the activation of the measurement gap configuration within the time period.

6. The first device of claim 1, wherein the at least one parameter is obtained from the second device or determined by the first device.

7. The first device of claim 1, wherein the at least one parameter is determined based on at least one of the following: a service associated with the at least one parameter, the bandwidth part to be switched, a capability of the first device, or a pre-defined configuration applied to the first device and the second device.

8. The first device of claim 7, wherein if the switch of the bandwidth part is associated with a plurality of component carriers, the at least one parameter is further determined based on at least one of the following: the number of the plurality of component carriers; or a scaling factor indicating an incremental delay for each additional component carrier involved in the switch of the bandwidth part.

9. The first device of claim 1, wherein the at least one parameter is specific to a particular measurement gap configuration of concurrent measurement gap configurations or is shared by a plurality of concurrent measurement gap configurations of the first device.

10. The first device of claim 1, wherein the measurement gap configuration is configured to the first device by the second device through at least one of the following: the message for bandwidth part switching for the first device, wherein the message comprises the measurement gap configuration, a further message comprising the measurement gap configuration transmitted after the message for bandwidth part switching for the first device, or a further message comprising the measurement gap configuration pre-configured before the message for bandwidth part switching for the first device.

11. The first device of claim 1, wherein the at least one memory and the computer program code are configured to, with the at least one processor, cause the first device to enable the functionality of delaying to apply the at least one of measurement gap by: delaying to apply the measurement gap if the first device receives, from the second device, an indication for enabling the functionality in the first device to delay to apply the at least one measurement gap.

12. A method comprising:
receiving, by a first device from a second device, a message for bandwidth part switching for the first device the message triggering the first device to activate a measurement gap configuration, the measurement gap configuration indicating one or more measurement gaps;
delay to apply at least one measurement gap of the one or more measurement gaps based on at least one parameter, wherein the at least one parameter is an interval threshold; and
cause the first device to delay to apply a measurement gap of the one or more measurement gaps if:
an interval between a time window for processing the message by the first device and the measurement gap is below the interval threshold.

13. The method of claim 12, comprising: delaying to apply a measurement gap of the one or more measurement gaps if: a time window for processing the message by the first device is at least partly overlapped with the measurement gap.

14. The method of claim 12, comprising:
applying the measurement gap by: determining the interval based on a time point of reception of the message to a starting time point of the measurement gap, or based on an ending time point of the time window to the starting time point of the measurement gap; and delaying to apply the measurement gap if the interval is below the interval threshold.

15. The method of claim 12, comprising:
delaying to apply the at least one measurement gap by: delaying to apply a measurement gap of the one or more measurement gaps if an overlapped duration of a time window for processing the message and the measurement gap is below the overlap threshold; and
applying the measurement gap if the overlapped duration is above the overlap threshold.

16. The method of claim 12, wherein the at least one parameter is a time period and the starting point of the time period is a time point of reception of the message or an ending time point of a time window for processing the message; and wherein the at least one memory and the computer program code are configured to, with the at least one processor, cause the first device to delaying to apply the at least one measurement gap by: delaying the activation of the measurement gap configuration within the time period.

17. A second device comprising:
at least one processor; and
at least one memory including computer program code;
wherein the at least one memory and the computer program code are configured to, with the at least one processor, cause the second device to:
transmit, to a first device, a message for bandwidth part switching for the first device, the message triggering the first device to activate a measurement gap configuration, the measurement gap configuration indicating one or more measurement gaps;

enable based on at least one parameter a transmission with the first device during at least one measurement gap of the one or more measurement gaps, wherein the at least one parameter is an interval threshold; and cause the second device to enabling the transmission with the first device if:

an interval between a time window for processing the message by the first device and the measurement gap is below the interval threshold.

18. The second device of claim 17, wherein the at least one memory and the computer program code are configured to, with the at least one processor, cause the second device to enable the transmission with the first device by: enabling the transmission with the first device if: a time window for processing the message by the first device is at least partly overlapped with the measurement gap, or receive a transmission from the first device during the measurement gap.

19. The second device of claim 17, wherein the at least one memory and the computer program code are configured to, with the at least one processor, further cause the second device to enable the transmission with the first device by: determining the interval based on one of the following: a time point of reception of the message to a starting time point of the measurement gap, or an ending time point of the time window to the starting time point of the measurement gap; and enabling the transmission with the first device if the interval is below the interval threshold.

20. The second device of claim 17, wherein the at least one parameter is an overlap threshold; and wherein the at least one memory and the computer program code are configured to, with the at least one processor, further cause the second device to enabling the transmission with the first device by: enabling the transmission with the first device if an overlapped duration of a time window for processing the message and the measurement gap is below the overlap threshold; and disabling the transmission with the first device if the overlapped duration is above the overlap threshold.

* * * * *